US012495120B2

(12) United States Patent
Gerwe et al.

(10) Patent No.: US 12,495,120 B2
(45) Date of Patent: Dec. 9, 2025

(54) MULTI-SPECTRAL AND PANCHROMATIC IMAGING APPARATUS AND ASSOCIATED SYSTEM AND METHOD

(71) Applicant: The Boeing Company, Chicago, IL (US)

(72) Inventors: David R. Gerwe, West Hills, CA (US); Friedrich W. Kunzler, Hacienda Heights, CA (US)

(73) Assignee: The Boeing Company, Arlington, VA (US)

( * ) Notice: Subject to any disclaimer, the term of this patent is extended or adjusted under 35 U.S.C. 154(b) by 297 days.

(21) Appl. No.: 17/742,220

(22) Filed: May 11, 2022

(65) Prior Publication Data
US 2023/0370563 A1 Nov. 16, 2023

(51) Int. Cl.
H04N 5/225 (2006.01)
G06T 3/4053 (2024.01)
H04N 5/265 (2006.01)
H04N 23/45 (2023.01)
H04N 23/55 (2023.01)
H04N 23/58 (2023.01)
H04N 23/84 (2023.01)
H04N 23/951 (2023.01)
H04N 25/11 (2023.01)
G02B 5/20 (2006.01)
G02B 27/28 (2006.01)

(52) U.S. Cl.
CPC ........... H04N 5/265 (2013.01); G06T 3/4053 (2013.01); H04N 23/45 (2023.01); H04N 23/55 (2023.01); H04N 23/58 (2023.01); H04N 23/84 (2023.01); H04N 23/951 (2023.01); H04N 25/11 (2023.01); G02B 5/201 (2013.01); G02B 27/288 (2013.01)

(58) Field of Classification Search
CPC .................................................... G06T 3/4053
See application file for complete search history.

(56) References Cited

U.S. PATENT DOCUMENTS 5,790,188 A * 8/1998 Sun ........................ G01J 3/2823
348/143
7,885,535 B2 * 2/2011 Horowitz ............... H04N 23/75
396/275

(Continued)

FOREIGN PATENT DOCUMENTS

EP 3720123 10/2020
WO 2012/148919 11/2012

(Continued)

OTHER PUBLICATIONS

Rogne et al., Passive target detection using polarized components of infrared signatures, SPIE, 1990, p. 242-251, vol. 1317.

(Continued)

Primary Examiner — Gary C Vieaux
(74) Attorney, Agent, or Firm — Kunzler Bean & Adamson

(57) ABSTRACT

An image capture apparatus comprises a focal plane array having a first portion and a second portion and a plurality of detectors. The image capture apparatus further comprises a filter device coupled with the covering the first portion of the focal plane array, the filter device comprising at least a first bandpass filter, comprising a first frequency range, and a second bandpass filter, comprising a second frequency range that is different from the first frequency range. The second portion of the focal plan array is uncovered by the filter device.

20 Claims, 8 Drawing Sheets

(56) References Cited

U.S. PATENT DOCUMENTS

| | | | |
|---|---|---|---|
| 11,740,188 B2* | 8/2023 | Cao | G01T 1/29 |
| | | | 378/62 |
| 2006/0022121 A1 | 2/2006 | Tan et al. | |
| 2011/0080487 A1 | 4/2011 | Venkataraman et al. | |
| 2012/0293669 A1* | 11/2012 | Mann | G01J 3/36 |
| | | | 348/207.11 |
| 2016/0011050 A1* | 1/2016 | Skauli | G01J 3/26 |
| | | | 348/273 |
| 2016/0269694 A1* | 9/2016 | Masuda | H04N 23/16 |
| 2017/0336322 A1 | 11/2017 | Morin et al. | |
| 2019/0188827 A1* | 6/2019 | Mitani | H04N 23/80 |
| 2019/0346307 A1* | 11/2019 | Genier | G01J 3/2803 |
| 2020/0256727 A1* | 8/2020 | Smith | G01J 3/0229 |
| 2022/0019647 A1 | 1/2022 | Singh | |
| 2022/0260340 A1* | 8/2022 | Choiniere | G01J 3/0227 |

FOREIGN PATENT DOCUMENTS

| | | |
|---|---|---|
| WO | 2015/169875 | 11/2015 |
| WO | 2018/102171 | 6/2018 |
| WO | 2020/167659 | 8/2020 |

OTHER PUBLICATIONS

U.S. Appl. No. 17/967,215, filed Oct. 17, 2022.
Elad et al., Restoration of a Single Superresolution Image from Several Blurred, Noisy, and Undersampled Measured Images, IEEE Transactions on Image Processing, Dec. 1997, pp. 1646-1658, vol. 6, No. 12.
Farsiu et al., Fast and Robust Multiframe Super Resolution, IEEE Transactions on Image Processing, Oct. 2004, pp. 1327-1344, vol. 13, No. 10.
Hardie et al., High-resolution image reconstruction from a sequence of rotated and translated frames and its application to an infrared imaging system, Optical Engineering, Jan. 1998, pp. 247-260, vol. 37, No. 1., Society of Photo-Optical Instrumentation Engineers.
U.S. Appl. No. 17/554,781, filed Dec. 17, 2021.
Extended European Search Report for EP Application No. 23170919.7 dated Sep. 20, 2023.
Jovanovic et al., "Automated Data 7,8,11 Production for a Novel Airborne Multiangle Spectropolarimetric Imager (AIRMSPI)", International Archives of the Photogrammetry, Remote Sensing and Spatial Information Sciences, Aug. 25-Sep. 1, 2012, pp. 1-6, vol. XXXIX-B1, XCII ISPRS Congress, Melbourne, Australia.

* cited by examiner

MULTI-SPECTRAL AND PANCHROMATIC IMAGING APPARATUS AND ASSOCIATED SYSTEM AND METHOD

FIELD

This disclosure relates generally to an image capture apparatus, and more particularly to an image capture apparatus for generating multi-spectral composite images and panchromatic images.

BACKGROUND

Imaging apparatuses using electro-optical sensors, which receive electromagnetic radiation signals from or reflected by an object, are used to determine one or more characteristics of the object. Multi-spectral sensors, which are one type of electro-optical sensor, capture images at different wavelengths. Polarization sensors, which are also another type of electro-optical sensor, divide received light in a captured image into different planes of polarization. Imaging apparatuses having multi-spectral sensors and/or polarization sensors are useful for imaging in many applications including, but not limited to, terrain classification, detecting specific ground-based materials/objects (e.g., minerals, paints, metals, vehicles, roads), and characterizing atmospheric conditions/objects (e.g., clouds, weather, climate).

Some imaging apparatuses, which include multiple sensors, are complex and expensive. For example, certain imaging apparatuses require separate cameras and/or optical beam splitters for each one of multiple spectral bands and/or polarization channels. Furthermore, generating a panchromatic image using separate cameras and/or optical beam splitters requires additional hardware and software components, which further increases the complexity and expense of the imaging apparatus.

SUMMARY

The subject matter of the present application has been developed in response to the present state of the art, and in particular, in response to the problems of and needs created or not yet fully solved by conventional imaging apparatuses. Generally, the subject matter of the present application has been developed to provide image capture apparatuses, and associated systems and methods, that overcome at least some of the above-discussed shortcomings of prior art systems.

Disclosed herein is an image capture apparatus. The apparatus comprises a focal plane array comprising a first portion, a second portion, and a plurality of detectors. The apparatus also comprises a filter device coupled with and covering the first portion of the focal plane array. The filter device comprising at least a first bandpass filter, comprising a first frequency range, and a second bandpass filter, comprising a second frequency range that is different from the first frequency range. The second portion of the focal plane array is uncovered by the filter device. The preceding subject matter of this paragraph characterizes example 1 of the present disclosure.

The first portion of the focal plane array is larger than the second portion of the focal plane array. The preceding subject matter of this paragraph characterizes example 2 of the present disclosure, wherein example 2 also includes the subject matter according to example 1, above.

The first portion of the focal plane array is at least two times as large as the second portion of the focal plane array. The preceding subject matter of this paragraph characterizes example 3 of the present disclosure, wherein example 3 also includes the subject matter according to example 2, above.

The second portion of the focal plane array is between one half and one eighth of a total size of the focal plane array. The preceding subject matter of this paragraph characterizes example 4 of the present disclosure, wherein example 4 also includes the subject matter according to any of examples 1-3, above.

The first frequency range is associated with a first color and the second frequency range is associated with a second color that is different than the first color. The preceding subject matter of this paragraph characterizes example 5 of the present disclosure, wherein example 5 also includes the subject matter according to any of examples 1-4, above.

The first bandpass filter and the second bandpass filter are configured to filter out frequencies of light outside a frequency range that varies from an infrared frequency to an ultraviolet frequency. The preceding subject matter of this paragraph characterizes example 6 of the present disclosure, wherein example 6 also includes the subject matter according to any of examples 1-5, above.

The filter device further comprises at least a first polarization filter, comprising a first polarization value, and a second polarization filter, comprising a second polarization value that is different from the first polarization value. The preceding subject matter of this paragraph characterizes example 7 of the present disclosure, wherein example 7 also includes the subject matter according to any of examples 1-6, above.

The first polarization filter and the second polarization filter have a linear polarization that varies from a 45-degree polarization to a negative 45-degree polarization, relative to the focal plane array. The preceding subject matter of this paragraph characterizes example 8 of the present disclosure, wherein example 8 also includes the subject matter according to example 7, above.

Further disclosed here is an image capture system. The image capture system comprising a focal plane array comprising a first portion, a second portion, and a plurality of detectors. The image capture system also comprises a filter device coupled with and covering the first portion of the focal plane array. The filter device comprises at least a first bandpass filter, comprising a first frequency range, and a second bandpass filter, comprising a second frequency range that is different from the first frequency range. The second portion of the focal plane array is uncovered by the filter device. The image capture system further comprises a controller communicatively coupled with the filter device and the focal plane array. The controller configured to control the plurality of detectors of the focal plane array to capture a first image of an area when a capture-portion of the area is in a first linear alignment with the first bandpass filter and a corresponding one of the plurality of detectors. The controller also configured to control the plurality of detectors of the focal plane array to capture a second image of the area when the capture-portion of the area is in a second linear alignment with the second bandpass filter and a corresponding one of the plurality of detectors, the second linear alignment substantially matching the first linear alignment. The controller further configured to control the plurality of detectors of the focal plane array to capture a third image of the area when the capture-portion of the area is in a third linear alignment with the second portion of the focal plane array and a corresponding one of the plurality of detectors, the third linear alignment substantially matching the first linear alignment and the second linear alignment. The controller also configured to generate a multi-spectral composite image using at least the first image and the second image. The controller further configured to generate a context image using the third image. The preceding subject matter of this paragraph characterizes example 9 of the present disclosure.

The filter device is fixed to the first portion of the focal plane array, such that the filter device does not move relative to the first portion of the focal plane array. The controller is further configured to control adjustment of a position of the focal plane array, relative to the capture-portion of the area, to generate the second linear alignment and the third linear alignment with the capture-portion of the area. The preceding subject matter of this paragraph characterizes example 10 of the present disclosure, wherein example 10 also includes the subject matter according to example 9, above.

The filter device is movable relative to the first portion of the focal plane array. The controller is further configured to control adjustment of the position of the filter device to generate the second linear alignment with the capture-portion of the area by controlling a shift in a position of the filter device, relative to the second portion of the focal plane array. The controller is further configured to control adjustment of the position of the focal plane array, relative to the capture-portion of the area, to generate the third linear alignment with the capture-portion of the area. The preceding subject matter of this paragraph characterizes example 11 of the present disclosure, wherein example 11 also includes the subject matter according to any of examples 9-10, above.

The filter device further comprises at least a first polarization filter, comprising a first polarization value, and a second polarization filter, comprising a second polarization value that is different from the first polarization value. The controller is configured to control the plurality of detectors of the focal plane array to capture a fourth image of the area when the capture-portion of the area has a fourth linear alignment with the first polarization filter and a corresponding one of the plurality of detectors, the fourth linear alignment substantially matching the first linear alignment and the second linear alignment. The controller is also configured to control the plurality of detectors of the focal plane array to capture a fifth image of the area when the capture-portion of the area has a fifth linear alignment with the second polarization filter and a corresponding one of the plurality of detectors, the fifth linear alignment substantially matching the first linear alignment, the second linear alignment and the fourth linear alignment. The controller is further configured to generate a multi-spectral and multi-polarization composite image using at least the first image, the second image, the fourth image and the fifth image. The preceding subject matter of this paragraph characterizes example 12 of the present disclosure, wherein example 12 also includes the subject matter according to any of examples 9-11, above.

The image capture system further comprises a measuring device configured to track a movement of the focal plane array relative to the capture-portion of the area. The controller further configured to control the plurality of detectors of the focal plane array to capture the second image in response to determining, based on the movement, that the capture-portion of the area has the second linear alignment with the second bandpass filter and a corresponding one of the plurality of detectors. The controller also configured to capture the third image in response to determining, based on the movement, that the capture-portion of the area has the third linear alignment with the second portion of the focal plane array and a corresponding one of the plurality of detectors. The preceding subject matter of this paragraph characterizes example 13 of the present disclosure, wherein example 13 also includes the subject matter according to any of examples 9-12, above.

The controller is further configured to control the plurality of detectors of the focal plane array to capture a plurality of third images of the capture-portion of the area as the second portion of the focal plane array is moved relative to the capture-portion of the area and a corresponding one of the plurality of detectors. The controller further configured to combine the plurality of third images into a super resolution context image. The preceding subject matter of this paragraph characterizes example 14 of the present disclosure, wherein example 14 also includes the subject matter according to any of examples 9-13, above.

Additionally, disclosed here in a method of capturing image data. The method comprises capturing, with an image capture apparatus, a first image of an area when a capture-portion of the area is in a first linear alignment with a first bandpass filter of a filter device and a corresponding one of a plurality of detectors of a focal plane array, the filter device coupled to a first portion of the focal plane array. The method also comprises capturing, with the image capture apparatus, a second image of the area when the capture-portion of the area is in a second linear alignment with a second bandpass filter of the filter device and a corresponding one of the plurality of detectors, the second linear alignment substantially matching the first linear alignment. The method further comprises capturing, with the image capture apparatus, a third image of the area when the capture-portion of the area is in a third alignment with a second portion of the focal plane array and a corresponding one of the plurality of detectors, the third linear alignment substantially matching the first linear alignment and the second linear alignment. Additionally, the method also comprises generating a multi-spectral composite image using at least the first image and the second image. The method further comprises generating a context image using the third image. The preceding subject matter of this paragraph characterizes example 15 of the present disclosure.

The method further comprises capturing, with the image capture apparatus, a fourth image of the area when the capture-portion of the area is in a fourth linear alignment with at least one polarization filter of the filter device and a corresponding one of the plurality of detectors, the fourth linear alignment substantially matching the first linear alignment and the second linear alignment. The step of generating a composite image comprises generating a multi-spectral and polarization composite image using at least the first image, the second image, and the fourth image. The preceding subject matter of this paragraph characterizes example 16 of the present disclosure, wherein example 16 also includes the subject matter according to example 15, above.

The step of capturing, with the image capture apparatus, the third image of the area comprises capturing a plurality of third images of the capture-portion of the area as the second portion of the focal plane array is moved relative to the area. Further the step of generating a context image comprises combining the plurality of third images to generate a super resolution context image. The preceding subject matter of this paragraph characterizes example 17 of the present disclosure, wherein example 17 also includes the subject matter according to any of examples 15-16, above.

The method further comprises a step of adjusting a position of the focal plane array, relative to the capture-portion of the area, to generate the second linear alignment and the third linear alignment. The preceding subject matter of this paragraph characterizes example 18 of the present disclosure, wherein example 18 also includes the subject matter according to any of examples 15-17, above.

The method further comprises step of adjusting a position of the filter device, relative to the first portion of the focal plane array, to generate the second linear alignment and adjusting a position of the focal plane array, relative to the capture-portion of the area, to generate the third linear alignment. The preceding subject matter of this paragraph characterizes example 19 of the present disclosure, wherein example 19 also includes the subject matter according to any of examples 15-18, above.

The method also comprises the step of tracking movement of the focal plane array relative to the capture-portion of the area. The method further comprises the step of capturing the second image in response to determining, based on a tracked movement of the focal plane array, that the capture-portion of the area is in the second linear alignment with the second bandpass filter and a corresponding one of the plurality of detectors. The method additionally comprises the step of capturing the third image in response to determining, based on the tracked movement of the focal plane array, that the capture-portion of the area is in the third linear alignment with the second portion of the focal plane array and a corresponding one of the plurality of detectors. The preceding subject matter of this paragraph characterizes example 20 of the present disclosure, wherein example 20 also includes the subject matter according to any of examples 15-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Figure 1:
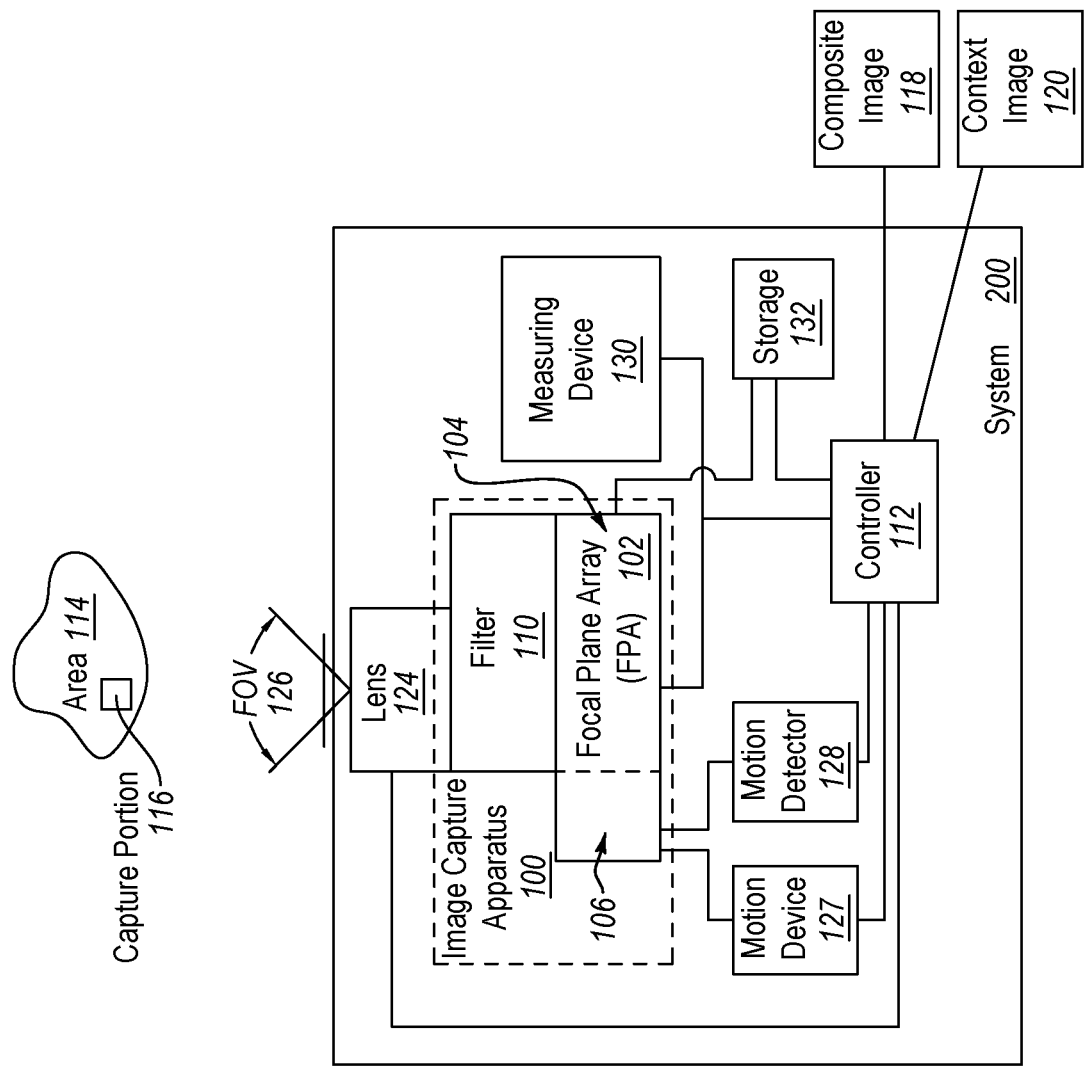
FIG. 1 is a schematic block view of an image capture system, according to one or more examples of the present disclosure.

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein is an image capture apparatus and system that includes a focal plane array and a filter device, which can include multi-spectral filters (e.g., bandpass filters) and/or polarization filters. The image capture apparatus is configured to capture images in multiple spectral frequencies and/or polarizations, as well as, to capture a panchromatic context image. The image capture apparatus is helpful in cases where images of objects are captured from a distance (e.g., captured from space) as the multi-spectral filters and/or polarization filters can be used to generate high-resolution images. For example, the image capture apparatus can be useful for terrain classification, detecting specific ground-based materials/objects (e.g., minerals, paints, metals, vehicles, roads), and characterizing atmospheric conditions/objects (e.g., clouds, weather, climate), especially when imaging from a distance. The image capture apparatus, disclosed herein, has reduced hardware and complexity, compared to conventional imaging apparatus, as the multiple spectral frequencies and/or polarizations, as well as, the panchromatic context imaging capabilities, are combined into a simplified filter device and focal plane array.

Using the image capture apparatus and system, movement of the filter device, the focal plane array, or both, is controlled to capture different images that have substantially similar linear alignments to a capture-portion within an area using different bandpass filters and/or polarization filters or unfiltered areas. In some cases, movement of the filter device and/or focal plane array is tracked, such as tracking the movement of individual components of the image capture apparatus or tracking the movement of a platform (e.g., an aircraft or satellite) on which the image capture apparatus is coupled. Based on the tracked movement, image capture timing can be determined, so that detectors corresponding to one location in the filter device capture nearly the same capture-portion at a first linear alignment as detectors corresponding to other locations in the filter device at a substantially similar linear alignment. Images, of nearly the same capture-portion of the area captured with detectors corresponding to different bandpass filters and/or polarization filters, are saved and used to generate a composite image. Nonconforming images (e.g., images determined to not have detectors capturing nearly the same capture-portion of the area) are discarded and therefore not included in the composite image.

Improved resolution of the generated composite image is realized by capturing multiple images having a substantially similar linear alignment between the capture-portion and detectors of a focal plane array. The multiple images are generated using different filter configurations, such that a particular feature in the capture-portion is captured though different filters in the multiple images. As an example, a feature that is centered in an instantaneous field of view of a detector is captured by the detector, corresponding with a first bandpass filter, and the same feature is also captured by detectors corresponding to other bandpass and/or polarization filters. As a result, a relatively large number of images having similar linear alignments with respect to detectors of the focal plane array, but different filters can be captured and processed to increase the resolution of the composite image. Furthermore, capturing images by detectors corresponding to different planes of polarization can produce images that result in man-made objects "popping out" against natural background in the captured image because man-made material tends to polarize light more strongly than natural material.

The image capture apparatus is also used to generate a panchromatic context image using the same focal plane array used to generating the composite image. Super resolution techniques, such as techniques known in the art of image processing, can be employed to enhance the resolution of the context image, such that a lower resolution individual context image can be enhanced to a higher resolution context image. Accordingly, super resolution techniques combine a plurality of lower resolution individual context images, which are often noisy and blurry images, to produce a higher resolution context image.

Referring to FIG. 1, an image capture system 200, including an image capture apparatus 100, is shown. The image capture system 200 enables generation of multiple images of an area in multiple spectral frequencies or polarizations, without the need for complex optics or multiple focal plane arrays. The image capture apparatus 100 includes a filter device 110 (e.g., filter) coupled with and covering a portion of a focal plane array 102, which includes a plurality of detectors 108 (see, e.g., FIG. 2). The image capture apparatus 110 can include, but is not limited to, a video camera, a picture camera, a thermal imaging camera, a microwave imager, or a radiation detector. The filter device 110 is coupled with a first portion 104 of the focal plane array 102, such that the first portion 104 is covered by the filter device 110 and a second portion 106 of the focal plane array 102 is not covered by the filter device 110. The filter device 110 includes multiple bandpass filters and/or polarization filters and is configured to interpose one or more filters between an area 114 and one or more detectors 108 of the focal plane array 102. Accordingly, in the first portion 104 of the focal plane array 102, the filter device 110 is positioned between the plurality of detectors 108 and the area 114 being imaged. In contrast, in the second portion 106 of the focal plane array 102, the plurality of detectors 108 are not covered, or otherwise not filtered, by the filter device 110.

The image capture system 200 additionally includes a controller 112 that is communicatively coupled with the filter device 110 and the focal plane array 102. The controller 112 is configured to control and communicate with the plurality of detectors 108 of the focal plane array 102. As a linear alignment between a detector 108 of the focal plane array 102 and a capture-portion 116 (e.g., a particular portion of the area 114 used to perform the linear alignment techniques described herein) is changed, such as when the image capture apparatus 100 is moved, the controller 112 is configured to capture images of the area 114 with at least one of plurality of detectors 108. Using the images obtained from the plurality of detectors 108 in the first portion 104 of the focal plane array 102, the controller 112 is configured to generate a composite image 118, such as a multi-spectral and/or multi-polarization composite image 118. Additionally, using the image(s) obtained from the plurality of detectors 108 in the second portion 106 of the focal plane array 102, the controller 112 is configured to generate a panchromatic context image 120.

In some examples, a measuring device 130, in communication with the controller 112, tracks the movement of the focal plane array 102 relative to the capture-portion 116. In other words, as the linear alignment of the focal plane array 102 is adjusted, the measuring device 130 tracks the movement and relays to the controller 112 when one the plurality of detectors 108 of the focal plane array 102 has the necessary linear alignment to capture an image of the area 114. Alternatively, or additionally, the measuring device 130, in communication with the controller 112, tracks the movement of the filter device 110 relative to the capture-portion 116. That is, as the linear alignment of the filter device 110 is adjusted, the measuring device 130 tracks the movement and relays to the controller 112 when one of the bandpass filters, polarization filters, or unfiltered area has the necessary linear alignment to capture an image of the area 114.

The image capture system 200 also includes optics, such as a lens 124, telescope, or other optics, that direct light, from the area 114, towards the focal plane array 102. The lens 124 has a field of view 126 that is directed towards the area 114. Moreover, the field of view 126 of the area 114 includes the capture-portion 116, which is detectable by the image capture apparatus 100. Accordingly, the field of view 126 of the lens 124 permits the area 114 to be imaged with the capture-portion 116 within the resulting image. In some examples, the movement of the lens 124 can be directed and tracked by a motion device 127 configured to move and direct the lens 124 in a direction towards the area 114 and a motion detector 128 configured to measure the motion of the lens 124, both of which are communicatively coupled with the controller 112.

The system 200 may also include storage 132 (e.g., a digital data storage device), such as a memory device, that is configured to store the images captured by the image capture apparatus 100.

In some examples, the controller 112 is communicatively connected to the filter device 110, focal plane array 102, the lens 124, the motion device 127, the motion detector 128, the measuring device 130, and the storage 132. The controller 112 is described as being communicatively connected with other component, where communicatively connected refers to any type of communication and/or connection between the components that allows the component to pass and/or receive signals and/or information from another component. The communication may be along any signal path, whether a wired or a wireless connection. The controller 112 may include, or be part of, a computing device that may include one or more processors, memory, and one or more communication interfaces.

Figure 2:
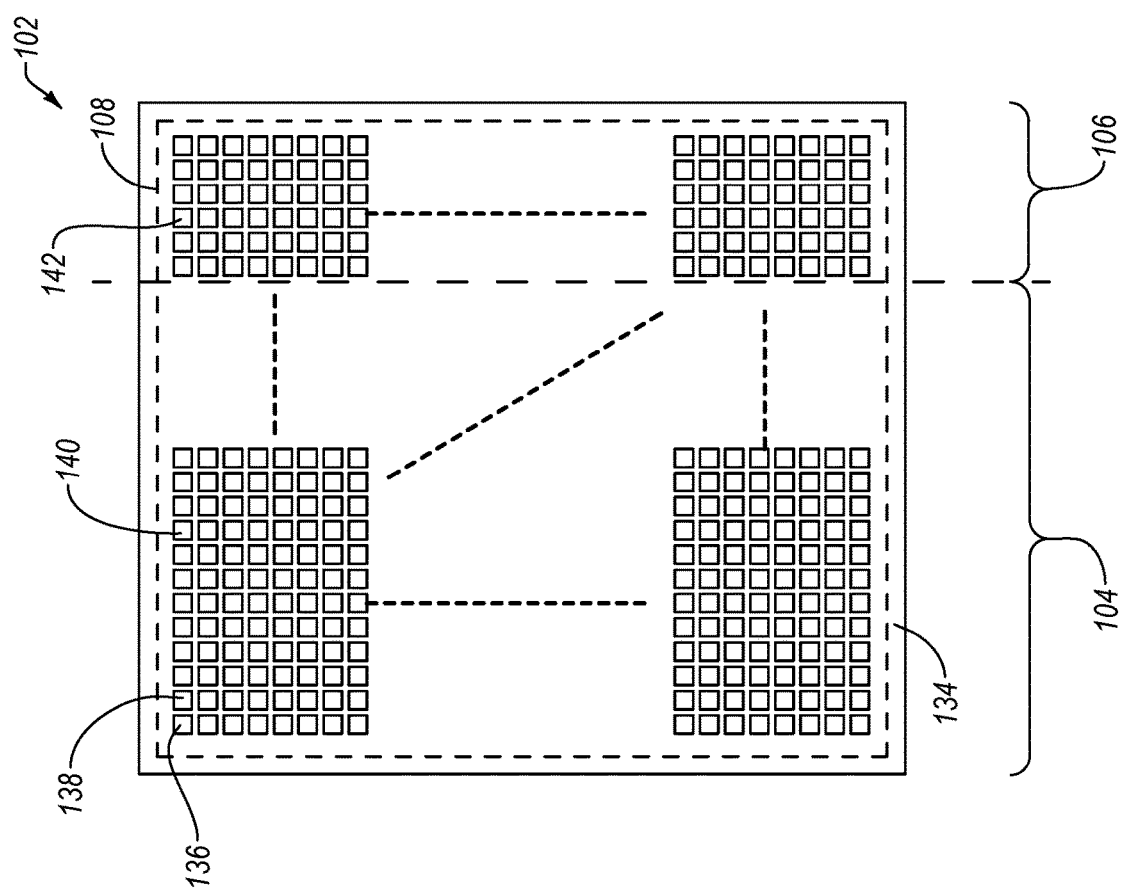
FIG. 2 is a schematic top plan view of a focal plane array, according to one or more examples of the present disclosure.

A top plan view of a focal plane array 102 is shown in FIG. 2. The focal plane array 102 includes a plurality of detectors 108 along a surface 134 of the focal plane array 102. The plurality of detectors 108 (e.g., in a rectangular array, a hexagonal array, or another regular or irregular arrangement of detectors) are configured to measure an intensity of received electromagnetic radiation and positioned to receive an image of an area of interest, such as at a focal plane of the image capture apparatus 100. The focal plane array 102 can include any of various amounts of detectors 108 along the surface 134, depending on the application and needs of the image capture apparatus 100. In some examples, the focal plane array 102 may be small with a small number of detectors 108, such as approximately 256 detectors. In other examples, the focal plane array 102 may be large with a large number of detectors 108, such as over 10,000 detectors. Accordingly, the focal plane array 102 is sized to correspond with the number of detectors of the plurality of detectors 108.

Some of the plurality of detectors, such as the first detector 136, the second detector 138, and the fourth detector 140 are in the first portion 104 of the focal plane array 102, while others of the plurality of detectors 108, such as the third detector 142, are in the second portion 106 of the focal plane array 102. The spacing between the plurality of detectors 108 can be uniform or non-uniform. In some examples, the plurality of detectors 108 are uniformly spaced apart from others of the plurality, including along the first portion 104 and the second portion 106 of the focal plane array 102. In other examples, the plurality of detectors 108 in the first portion 104 may have a different spacing between adjacent detectors than the plurality of detectors 108 in the second portion 106. In some examples, the first portion 104 of the focal plane array 102 is larger than the second portion 106 of the focal plane array 102 (see, e.g., FIG. 2). For example, the first portion 104 of the focal plane array 102 is at least two times as large as the second portion 106 of the focal plane array 102. In other examples, the second portion 106 of the focal plane array 102 is between one half and one eighth of the total size of the focal plane array 102.

Figure 3:
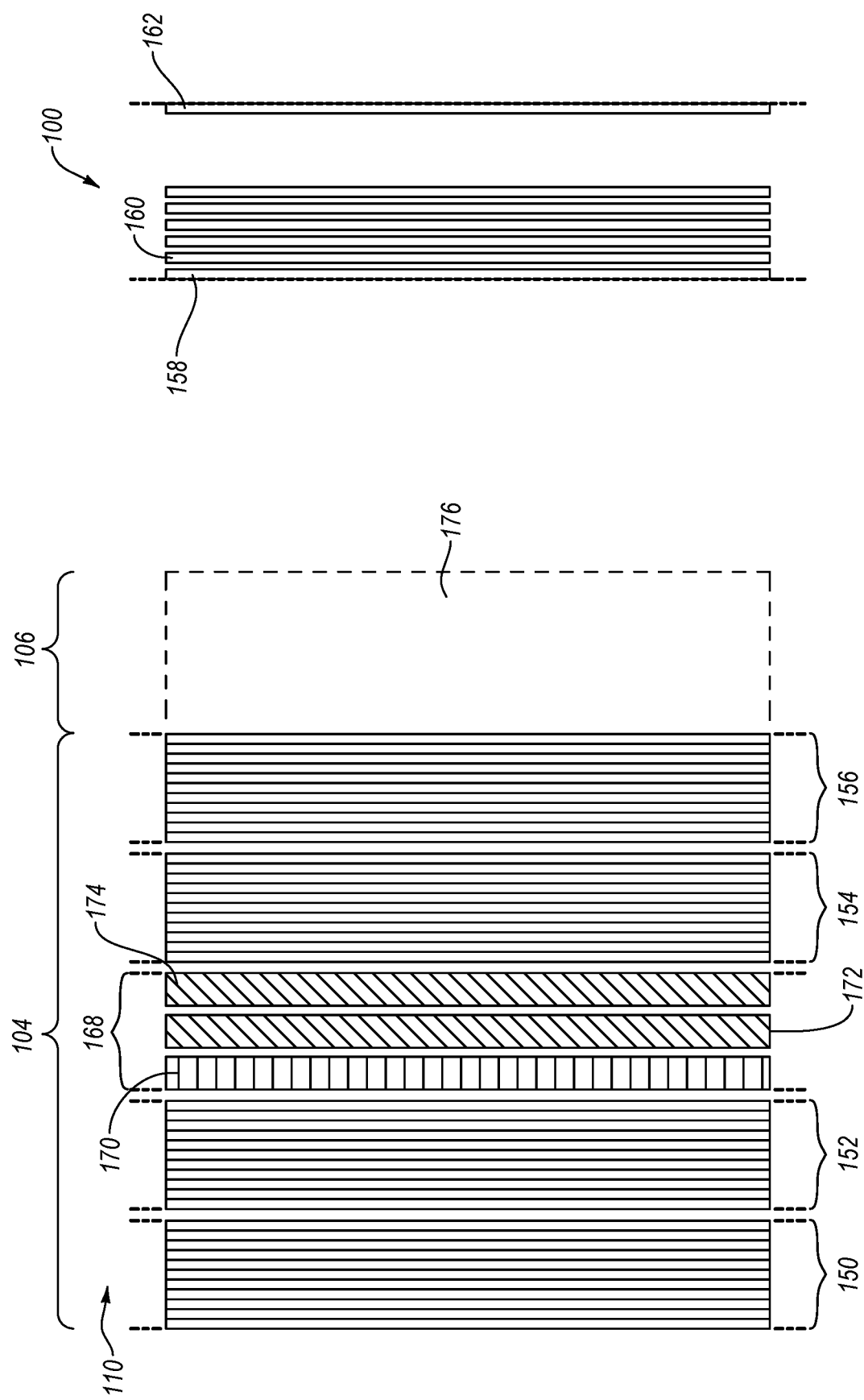
FIG. 3A is a schematic top plan view of a multi-spectral and multi-polarization filter device and an unfiltered area, according to one or more examples of the present disclosure.
FIG. 3B is a schematic top plan view of a butcher block type of spectral filter of the filter device shown in FIG. 3A, according to one or more examples of the present disclosure.

Referring to FIG. 3A, a top plan view of a filter device 110 is shown. The filter device 110 includes a plurality of bandpass filters (e.g., spectral filters) including at least a first bandpass filter and a second bandpass filter. In some examples, the filter device 110 is further arranged into multiple series of bandpass filters (e.g., butcher block type of bandpass filters), each series of bandpass filters having a repeating pattern of bandpass filters, including at least the first bandpass filter and the second bandpass filter. As shown, the filter device 110 includes four series of bandpass filters including a first series of bandpass filters 150, a second series of bandpass filters 152, a third series of bandpass filters 154, and a fourth series of bandpass filters 156. However, the filter device 110 could include any number of series of bandpass filters.

A series of bandpass filters, such as the first series of bandpass filters 150, is shown in FIG. 3B. For example, the first series of bandpass filters 150 can include a plurality of bandpass filters that include the first bandpass filter 158, the second bandpass filter 160, through an Nth bandpass filter 162, where N may be equal to any number based on the design of the filter device 110. Each bandpass filter is configured to pass electromagnetic radiation having frequencies within a specific frequency range (e.g., passband) and to block electromagnetic radiation having frequencies outside the specific frequency range. For example, the specific frequency range may vary from an infrared frequency to an ultraviolet frequency. The first bandpass filter 158 has a first frequency range and the second bandpass filter 160 has a second frequency range that is different from the first frequency range. In other words, in some examples, the first frequency range is associated with a first color and the second frequency range is associated with a second color. Likewise, the Nth bandpass filter 162 has a frequency range that is different from the first frequency range and the second frequency range. The series of bandpass filters may be repeated numerous times in the filter device 110 and a spectral image hypercube may be formed from images generated from each iteration of one of the series of bandpass filters. Alternatively, a single spectral image hypercube may be formed from combining all images generated from each of the series of bandpass filters in the filter device 110. Moreover, by repeatably capturing images of an area to produce the spectral image hypercube, the filter device 110 is capable of detecting moving targets or images in the area 114 by subtracting the produced spectral images to determine what is different in spectral images of the area 114.

As shown in FIG. 3A, in some examples, the filter device 110 also includes at least one polarization filter or a series of polarization filters 168, which includes a first polarization filter 170, a second polarization filter 172, and a third polarization filter 174 in the illustrated example. In some examples, the at least series of polarization filters 168 may include but is not limited to, a vertical polarization filter, a horizontal polarization filter, a positive 45-degree polarization filter, a negative 45-degree polarization filter, or other types of polarization filters with alternative linear polarizations, or left-hand or right-hand polarizations. The series of bandpass filters and the at least one polarization filter 168 correspond to the first portion 104 of the focal plane array 102 as the filter device 110 does not cover the second portion 106 of the focal plane array 102. Accordingly, an unfiltered area 176, as indicated by a dashed line is adjacent to the filter device 110 and corresponds to the second portion 106 of the focal plane array 102

Figure 4:
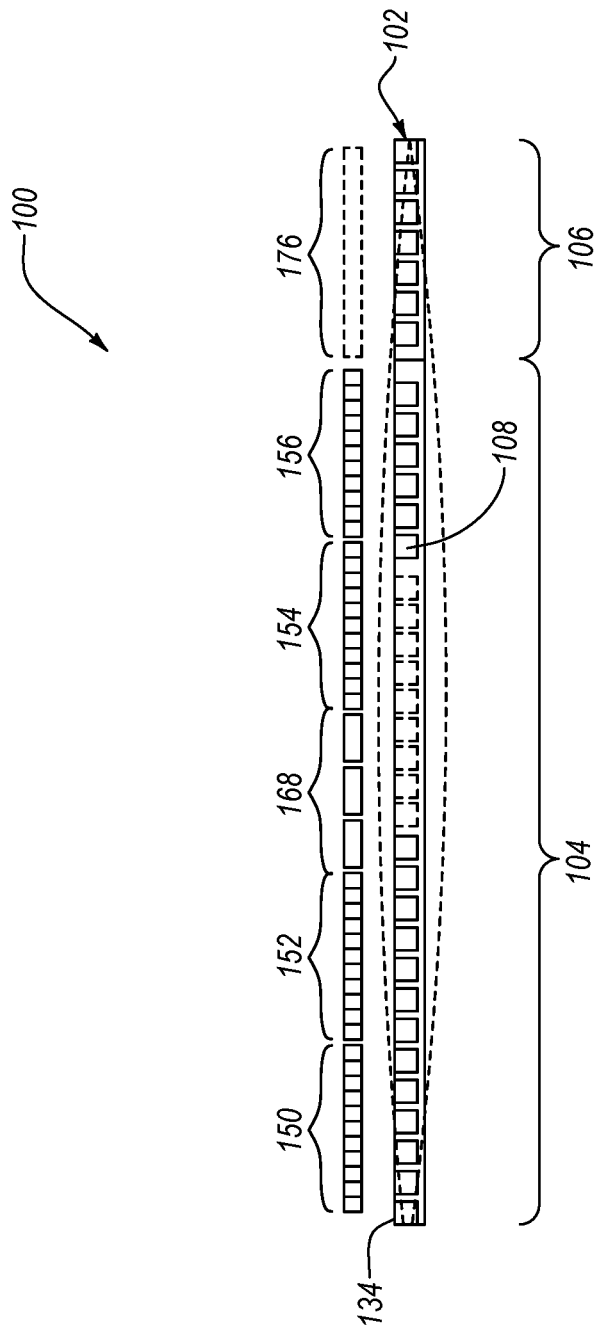
FIG. 4 is a schematic, sectional, side elevation view of a focal point array, and a multi-spectral and multi-polarization filter device, according to one or more examples of the present disclosure.

A sectional side elevation view of the image capture apparatus 100 is shown in FIG. 4. The first portion 104 of the focal plane array 102 is coupled with the filter device 110, while the second portion 106 of the focal plane array 102 remains uncovered by the filter device 110. The plurality of detectors 108 are spaced along the entirety of the focal plane array 102 such that the detectors 108 are along both the first portion 104 and the second portion 106. Accordingly, while imaging an area, the filter device 110 is interposed between the plurality of detectors 108 and the area 114 (see, e.g., FIG. 1) in the first portion 104 of the focal plane array 102, such that the plurality of detectors 108 of the first portion 105 are filtered. In contrast, the plurality of detectors 108 in the second portion 106 are not filtered by the filter device 110, as indicated by the unfiltered area 176. As compared to an image capture apparatus with a filter device extending across an entirety of a focal plane array, the filter device 110 of the image capture apparatus 100 has a smaller area as it does not extend across the entirety of the focal plane array 102. Accordingly, the individual filters (e.g., bandpass or polarization) have a smaller width or a smaller number of individual filters can be utilized in the filter device 110 as compared to a filter device extending across the entirety of a focal plane array.

Figure 5:
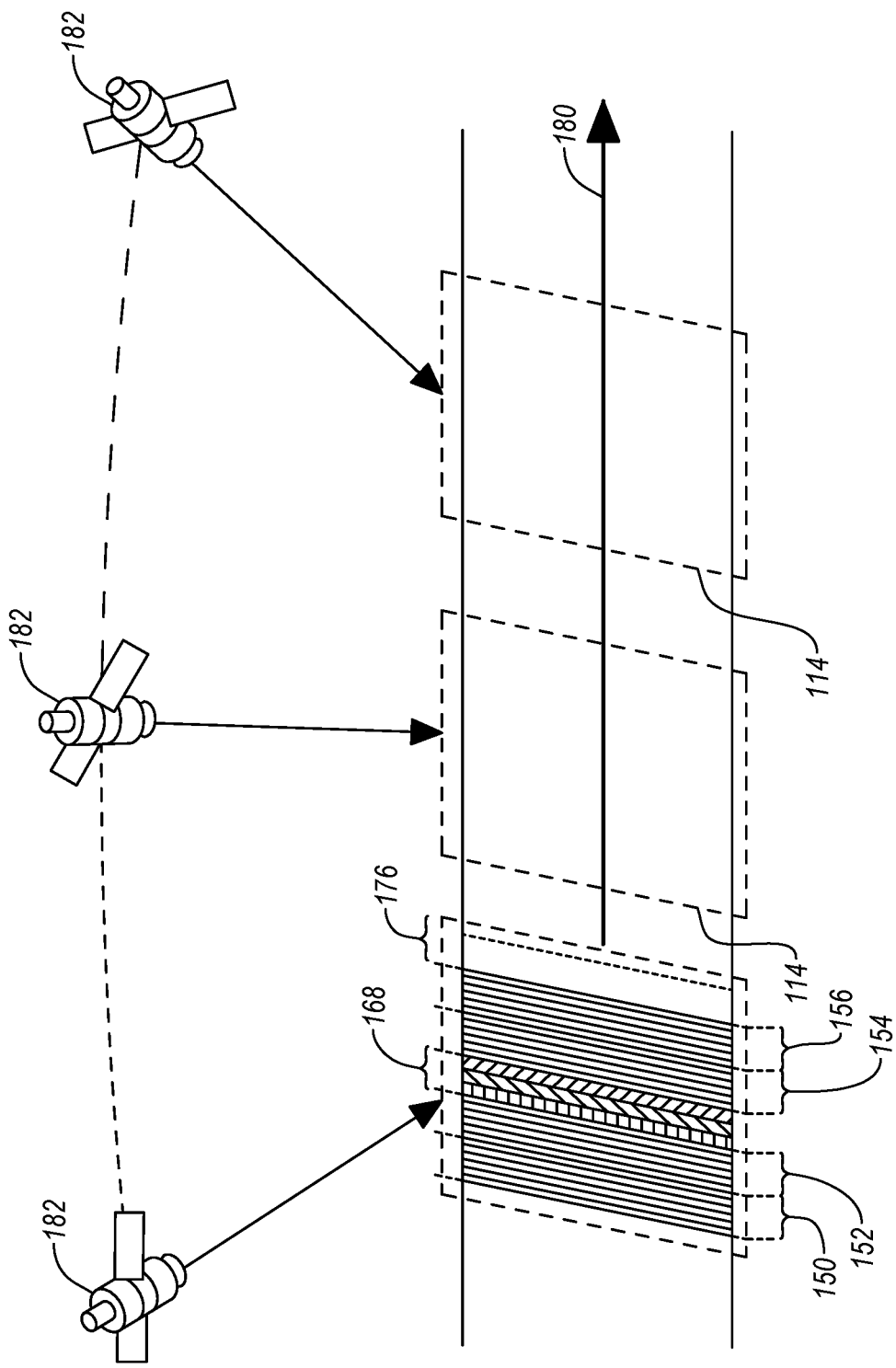
FIG. 5 is a schematic perspective view of satellite with an imager having a multi-spectral and multi-polarization filter device, and an unfiltered area, according to one or more examples of the present disclosure.

Referring to FIG. 5, the image capture apparatus 100 forms part of a satellite 182 and is used to image an area of a landmass. Accordingly, in some examples, the image capture apparatus 100 may be coupled with a movable platform or device, such as an aerial vehicle (e.g., satellite, spacecraft, or aircraft) or ground vehicle. The image capture apparatus 100 can be used to image a landmass on Earth, such as from the satellite 182. Additionally, the image capture apparatus 100 can also be used to image space objects, including but not limited to, planets, asteroid, or man-made space objects such as satellites, rocket bodies, or extra-solar objects. As shown, the satellite 182 moves along a path, which can be a generally straight path with a constant velocity and constant altitude, over a landmass while imaging an area 114 within of the landmass. The image capture apparatus 100, coupled with the satellite 182 and remote from the area 114, is configured to capture images of the area 114. In one example, the image capture apparatus 100 has a field of view that is swept across the landmass from the satellite 182 in a "push-broom" style while a sequence of individual images are collected from the area 114 (see, e.g. FIGS. 6A-6D). Alternatively, rather than sweeping the field of view 126 across the landmass in the push-broom style, the line of sight of the field of view may be mechanically or electronically moved by adjusting the location of the focal plane array 102, the filter device 110 or the lens 124.

In operation, in one example, each ground point in the area 114 is measured N times at each pixel as the field of view 126 of the lens 124 moves across the area 114 of the landmass at approximately one ground sampling distance (i.e., GSD) for each exposure of the image capture apparatus 100, where N is approximately equal to the number of pixels divided by the number of filters plus any buffers. The received raw images generated from the area 114, from the first portion 104 of the focal plane array 102, are co-added to build a hypercube (i.e., spectral image cube). In general, the co-adding of raw images increase the contrast-to-noise ratio by a factor of the square root of N and suppresses any spatial non-uniformity residual noise. Additionally, this process can be repeated multiple times at each ground point in the area 114. As shown in FIG. 5, the process is repeated three times and different angular locations of the satellite relative to the area 114, such as 0 degrees, 45 degrees, and −45 degrees. The received raw images generated from the area 114, from the second portion 106 of the focal plane array 102 and corresponding to the unfiltered area 176, are used to generated a panchromatic context image. In some examples, super resolution techniques are used to enhance the lower resolution of individual raw images to a higher resolution context image. For examples, the unfiltered area 176 can be very wide, such as hundreds of detectors 108 wide, which can generate a large number of individual raw images which can be processed using super resolution techniques to produce a high-resolution context image.

Figure 6A:
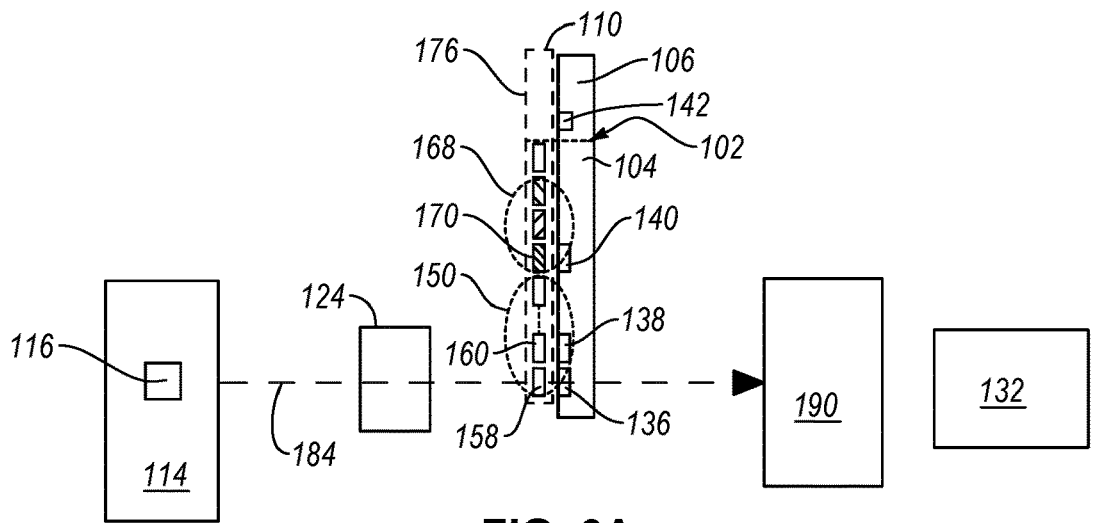
FIG. 6A is a schematic block diagram of a first linear alignment between a capture area and a first detector of the focal plane array, according to one or more examples of the present disclosure.

Referring to FIG. 6A, a block diagram of an example of a first linear alignment 184 between the capture-portion 116 of the area 114 and the first detector 136 of the focal plane array 102 is shown. The capture-portion 116 is aligned with the first detector 136 and the first bandpass filter 158 of the filter device 110 to produce the first image 190 that is stored in storage 132. For example, a line indicative of the first linear alignment 184 intersects the capture-portion 116 of the area 114, the lens 124, the first bandpass filter 158, and the first detector 136 of the focal plane array 102. As a result, electromagnetic radiation corresponding to the capture-portion 116 of the area 114 that reaches the first bandpass filter 158 is filtered to pass the first frequency range and to block frequencies outside the first frequency range such that, when the first image 190 is captured, a corresponding pixel (e.g., a pixel having a value based on the measured intensity value of the first detector 136 of the focal plane array 102) in the first image 190 includes data indicating an intensity of electromagnetic radiation received at the first detector 136. Other pixels in the first image 190 include data indicating an intensity of electromagnetic radiation received at other detectors 108 in the focal plane array 102, such as electromagnetic radiation that has been filtered through a corresponding bandpass filter or polarization filter in the first portion 104 of the focal plane array 102 or unfiltered through the second portion 106 of the focal plane array. Thus, the first image 190 includes multiple pixels, where each pixel in the first portion 104 has a single pixel value depending on which bandpass filter or polarization filter filtered the received electromagnetic radiation for the portion of the area 114 corresponding to that pixel and each pixel in the second portion 106 has a panchromatic value.

Figure 6B:
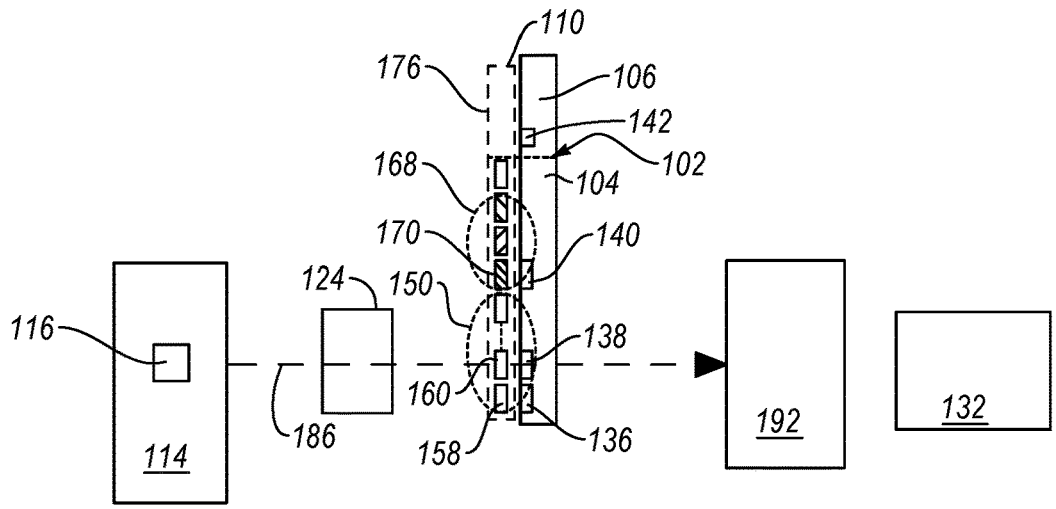
FIG. 6B is a schematic block diagram of a second linear alignment between the capture area and a second detector of the focal plane array, according to one or more examples of the present disclosure.

In FIG. 6B, a second linear alignment 186 is shown between the capture-portion 116 of the area 114 and the second detector 138 of the focal plane array 102. The capture-portion 116 is aligned with the second detector 138 and the second bandpass filter 160 of the filter device 110 to produce the second image 192 that is stored in storage 132. For example, a line indicated of the second linear alignment 186 intersects the capture-portion 116 of the area 114, the lens 124, the second bandpass filter 160, and the second detector 138 of the focal plane array 102. Thus, one or more component (e.g., the lens 124, the filter device 110, or the focal plane array 102) is adjusted such that the capture-portion 116 of the area 114 is aligned with the second bandpass filter 160 in substantially the same manner as the capture-portion 116 of the area 114 was aligned with the first bandpass filter 158 in the first linear alignment 184. For example, the one or more component is adjusted based on a physical dimension or size (e.g., a filter size) of an individual bandpass filter such that the second linear alignment 186 substantially matches the first linear alignment 184. In one example, the filter device 110 is fixed to the focal plane array 102, such that the filter device 110 does not move relative to the focal plane array 102. Accordingly, the focal plane array 102 is moved by a distance matching the physical size of an individual bandpass filter to achieve the second linear alignment 186. In other examples, not shown, the filter device 110 is moved relative to the focal plane array 102, such that the filter device 110 is moved by a distance matching the physical size of an individual bandpass filter to achieve the second linear alignment 186. As a result, the capture-portion 116 of the area 114 is filtered through the second frequency range such that, when the second image 192 is captured, a pixel corresponding with the second detector 138 includes data indicating an intensity of electromagnetic radiation received at the second detector 138. The second image 192 further depicts other portions of the area 114 in single colors, polarizations, or panchromatically corresponding to alignments with other filters or non-filter area.

Figure 6C:
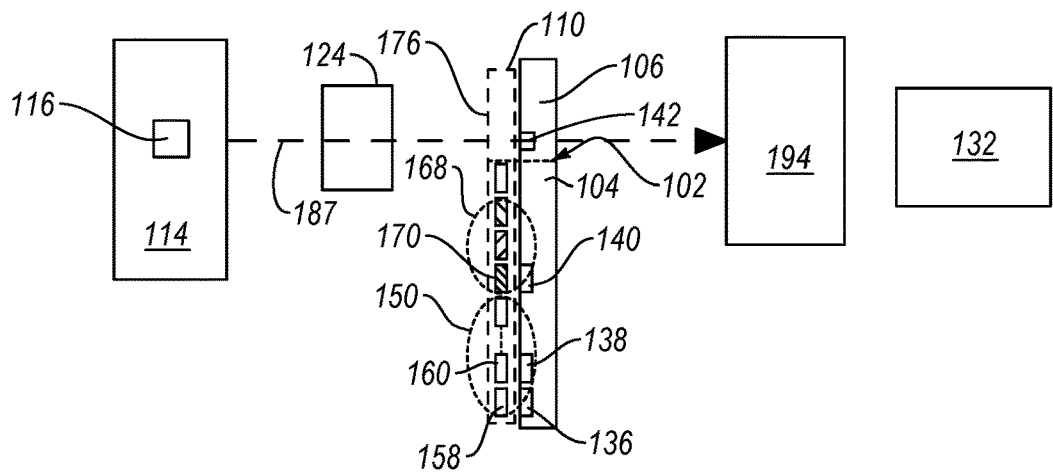
FIG. 6C is a schematic block diagram of a third linear alignment between the capture area and a third detector of the focal plane array, according to one or more examples of the present disclosure.
Figure 6D:
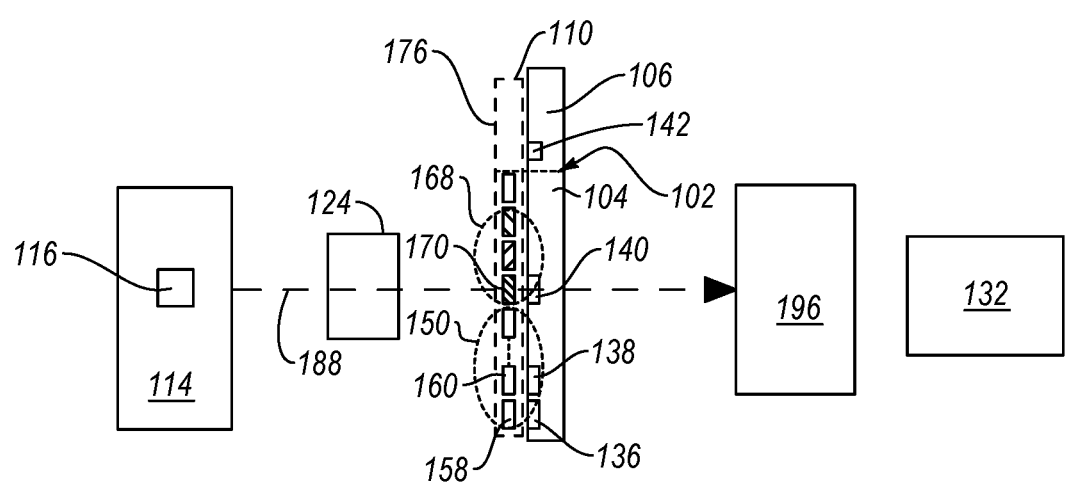
FIG. 6D is a schematic block diagram of a fourth linear alignment between the capture area and a fourth detector of the focal plane array, according to one or more examples of the present disclosure.

As shown in FIG. 6C, a third linear alignment 187 is shown between the capture-portion 116 of the area 114 and the third detector 142 of the focal plane array 102. The capture-portion 116 is aligned with the third detector 142 and the unfiltered area 176 to produce the third image 194 that is stored in storage 132. For example, a line indicative of the third linear alignment 187 intersects the capture-portion 116 of the area 114, the lens 124, the unfiltered area 176 adjacent to the filter device 110, and the third detector 142 of the focal plane array 102. As explained above in reference to FIG. 6B, one or more components are adjusted such that the capture-portion 116 of the area 114 is aligned with the unfiltered area 176 in substantially the same manner as the capture-portion 116 of the area 114 was aligned with the second bandpass filter 160 in the second linear alignment 186. As a result, the capture-portion 116 of the area 114 is not filtered such that when the third image 194 is captured, a pixel corresponding to the third detector 142 includes panchromatic data. The third image 194 depicts other portions of the area 114 in single colors, polarizations, or panchromatically corresponding to alignments with other filters or non-filtered area.

Similar adjustment techniques can be performed to generate additional images that depict the capture-portion 116 of the area 114 in other colors or polarizations. For example, in FIG. 6D, a fourth linear alignment 188 between the capture-portion 116 of the area 114 and the fourth detector 140 of the focal plane array 102 is shown. The capture-portion 116 is aligned with the fourth detector 140 and the first polarization filter 170 of the filter device 110 to produce the fourth image 196 that is stored in storage 132. For example, a line indicative of the fourth linear alignment 188 intersects the capture-portion 116 of the area 114, the lens 124, the first polarization filter 170, and the fourth detector 140 of the focal plane array 102. As explained above in reference to FIG. 6B, one or more components are adjusted such that the capture-portion 116 of the area 114 is aligned with the first polarization filter 170 in substantially the same manner as the capture-portion 116 of the area 114 was aligned with the second bandpass filter 160 in the second linear alignment 186. As a result, the capture-portion 116 of the area 114 is filtered through the first polarization filter such that, when the fourth image 196 is captured, a pixel corresponding with the fourth detector 140 includes data indicating a polarization received at the fourth detector 140. The fourth image 196 depicts other portions of the area 114 in single colors, polarizations, or panchromatically corresponding to alignments with other filters or non-filtered area.

Additionally, although not shown, the capture-portion of the area can be aligned with a fifth detector and a second polarization filter of the filter device to produce a fifth image that is store in storage. For example, a fifth linear alignment can intersect the capture-portion of the area, the lines, the second polarization filter, and the fifth detector of the focal plane array. As a result, the capture-portion of the area is filtered through the second polarization filter such that, when the fifth image is capture, a pixel corresponding with the fifth detector includes data indicating a polarization received at the fifth detector. The fifth image depicts other portions of the area in single colors, polarizations, or panchromatically corresponding to alignments with other filters or non-filtered area.

Once saved, at least the first image 190 and the second image 192 are used to generate a multi-spectral composite image that has a relatively high spectral resolution for the capture-portion 116 of the area 114. For example, the resolution for the capture-portion 116 of the area 114 in the composite image is higher than the resolution of the capture-portion 116 of the area 114 in individual images, such as the first image 190 and the second image 192. In some examples, the fourth image 196 and the fifth image can additionally be used to generate a multi-spectral and multi-polarization composite image. By adding additional images for each pixel in the focal plane array 102, corresponding to spectral filters and/or polarization filters, a high-quality composite image can be generated. Thus, the resolution of a composite image can be improved by capturing multiple images, such as the first image 190, the second image 192 and the fourth image 196 with a substantially similar linear alignment between the capture-portion 116 of the area 114 and detectors of the focal plane array 102, with different configurations of the bandpass filters and polarization filters.

Additionally, the third image 194 is used to generate a panchromatic context image. Super resolution techniques can be employed to enhance the resolution of the context image, such that the third image 194 can be combined with other images generated from the unfiltered area 176 to produce a higher resolution context image. Although shown as producing one image (e.g., one of images 190-196 corresponding to either a bandpass filter, polarization filter, or unfiltered area), it should be understood that the image capture apparatus 100 can produce many images corresponding to each bandpass filter, polarization filter, or unfiltered area, with each of the image having a similar linear alignment between the corresponding detector 108 and the capture-portion 116 of the area 114.

Figure 7:
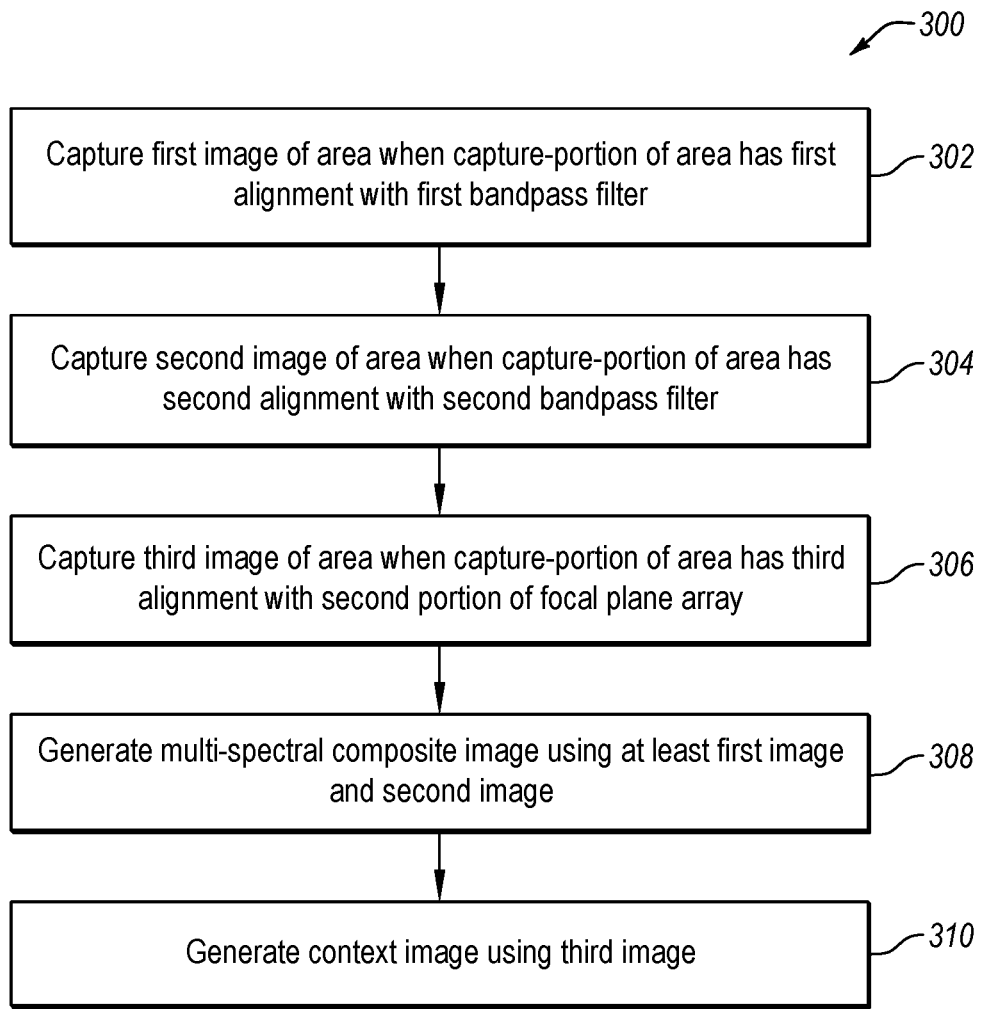
FIG. 7 is a schematic flow diagram of a method of capturing image data, according to one or more examples of the present disclosure.

As shown in FIG. 7, according to some examples, a method 300 of capturing image data the image capture system 200 of FIG. 6A-6D is shown. The method 300 includes (block 302) capturing, with an image capture apparatus 100, a first image 190 of an area 114 when a capture-portion 116 of the area 114 is in a first linear alignment 184 with a first bandpass filter 158 of a filter device 110 and a corresponding one of a plurality of detectors 108 of a focal plane array 102. The filter device 110 is coupled to a first portion 104 of the focal plane array 102. In some examples, the controller 112 is configured to initiate capture of the first image of the area 114 while the capture-portion 116 of the area 114 has the first linear alignment 184 with the corresponding detector 108, and the first bandpass filter 158 is between the capture-portion 116 of the area 114 and the corresponding detector.

The method 300 also includes (block 304) capturing, with the image capture apparatus 100, a second image 192 of the area 114 when the capture-portion 116 of the area 144 is in a second linear alignment 186 with a second bandpass filter 160 of the filter device 110 and a corresponding one of the plurality of detectors 108, the second linear alignment 186 substantially matching the first linear alignment 184. In some examples, the controller 112 is further configured to determine (e.g., detect or measure) when the capture-portion 116 of the area 114 has the second linear alignment 186 with the corresponding detector 108 of the focal plane array 102. In response to determining that the capture-portion 116 of the area 114 has the second linear alignment 186 and that the second bandpass filter 160 is between the capture-portion 116 of the area and the corresponding detector 108, the controller 112 is configured to initiate storage of the second image 192. The second image captured while the capture-portion 116 of the area 114 has the second linear alignment 186 with the corresponding detector 108. In some examples, the detector corresponding to the first bandpass filter 158 and the detector corresponding to the second bandpass filter 160 are different detectors. For example, when the focal plane array 102 has moved, relative to the area 114, by at least one detector width between capture of the first image 190 and capture of the second image 192. In other examples, the detector corresponding to the first bandpass filter 158 and the detector corresponding to the second bandpass filter 160 are the same detector. For example, the focal plane array 102 has not substantially moved relative to the area 114 between capture of the first image 190 and capture of the second image 192, rather the filter device 110 has moved.

The controller 112, in some examples, is configured to cause a position of one or more component of the image capture apparatus 100 to be adjusted to generate the second linear alignment 186 of the capture-portion 116 of the area 114 with the corresponding detector 108. The one or more component can include the filter device 110, the focal plane array 102, or the lens 124. In other examples, the position of one or more component of the image capture apparatus 100 can be adjusted by adjusting a platform on which the image capture apparatus 100 is coupled.

The method further includes (block 306) capturing, with the image capture apparatus 100, a third image 194 of the area 114 when the capture-portion 116 of the area 114 is in a third linear alignment 187 with a second portion 106 of the focal plane array 102 and a corresponding one of the plurality of detectors 108, the third linear alignment 187 substantially matching the first linear alignment 184 and the second linear alignment 186. In some examples, the controller 112 is further configured to determine when the capture-portion 116 of the area 114 has the third linear alignment 187 with the corresponding detector of the focal plane array 102. In response to determining that the capture-portion 116 of the area 114 has the third linear alignment 187 and that the unfiltered area 176 is between the capture-portion 116 of the area and the corresponding detector, the controller 112 is configured to initiate storage of the third image 194. The third image 194 captured while the capture-portion 116 of the area 114 has the third linear alignment 187 with the corresponding detector 108.

The method also includes (block 308) generating a multi-spectral composite image using at least the first image 190 and the second image 192. The multi-spectral composite image may have a relatively high spectral resolution for the capture-portion 116 of the area 114. For example, the spectral resolution for the capture-portion 116 of the area 114 in the multi-spectral composite image is higher than the spectral resolution of the capture-portion 116 of the area 114 in the individual images. Thus, the image capture apparatus 100 enables improved spectral resolution of the composite image by capturing multiple images (e.g., the first image 190 and the second image 192) with a substantially similar linear alignment between the capture-portion 116 of the area 114, the focal plane array 102, and using different configurations of the bandpass filters. Additionally, the method 300, in some examples, includes capturing additional images when the capture-portion 116 of the area 114 has a fourth linear alignment 188 with a polarization filter 168. Accordingly, the resulting image(s) can be added to the composite image to generate a multi-spectral and multi-polarization composite image.

The method 300 additionally includes (block 310) generating a context image using the third image 194. In some examples, the context image is a single panchromatic image. In other examples, the context image is a super resolution context image, such that multiple lower resolution individual context image are combined to produce a higher resolution context image.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. An image capture apparatus comprising:
a focal plane array comprising a first portion and a second portion each comprising a plurality of detectors; and
a filter device coupled with and covering the first portion of the focal plane array, the filter device comprising at least a first bandpass filter, comprising a first frequency range, and a second bandpass filter, comprising a second frequency range that is different from the first frequency range;
wherein:
the filter device is sized and positioned relative to the focal plane array so that the second portion of the focal plane array is uncovered by the filter device and the plurality of detectors of the second portion of the focal plane array detect light that has not passed through the filter device; and
the filter device is movable relative to the focal plane array.

2. The image capture apparatus of claim 1, wherein the first portion of the focal plane array is larger than the second portion of the focal plane array.

3. The image capture apparatus of claim 2, wherein the first portion of the focal plane array is at least two times as large as the second portion of the focal plane array.

4. The image capture apparatus of claim 1, wherein the second portion of the focal plane array is between one half and one eighth of a total size of the focal plane array.

5. The image capture apparatus of claim 1, wherein the first frequency range is associated with a first color and the second frequency range is associated with a second color that is different than the first color.

6. The image capture apparatus of claim 1, wherein the first bandpass filter and the second bandpass filter are configured to filter out frequencies of light outside a frequency range that varies from an infrared frequency to an ultraviolet frequency.

7. The image capture apparatus of claim 1, wherein the filter device further comprises at least a first polarization filter, comprising a first polarization value, and a second polarization filter, comprising a second polarization value that is different from the first polarization value.

8. The image capture apparatus of claim 7, wherein the first polarization filter and the second polarization filter have a linear polarization that varies from a 45-degree polarization to a negative 45-degree polarization, relative to the focal plane array.

9. The image capture apparatus of claim 1, wherein:
the focal plane array is configured to capture multiple images of an area;
some of the multiple images captured by the first portion of the focal plane array are configured to be used to generate a multi-spectral composite image; and
other ones of the multiple images captured by the second portion of the focal plane array are configured to be used to generate a panchromatic context image.

10. An image capture system comprising:
a focal plane array comprising a first portion and a second portion and a plurality of detectors;
a filter device coupled with and covering the first portion of the focal plane array, the filter device comprising at least a first bandpass filter, comprising a first frequency range, and a second bandpass filter, comprising a second frequency range that is different from the first frequency range, wherein the second portion of the focal plane array is uncovered by the filter device; and
a controller communicatively coupled with the filter device and the focal plane array, the controller configured to:
control the plurality of detectors of the focal plane array to:
capture a first image of an area when a capture-portion of the area is in a first linear alignment with the first bandpass filter and a corresponding one of the plurality of detectors;
capture a second image of the area when the capture-portion of the area is in a second linear alignment with the second bandpass filter and a corresponding one of the plurality of detectors, the second linear alignment substantially matching the first linear alignment; and
capture a third image of the area when the capture-portion of the area is in a third linear alignment with the second portion of the focal plane array and a corresponding one of the plurality of detectors, the third linear alignment substantially matching the first linear alignment and the second linear alignment;
generate a multi-spectral composite image using at least the first image and the second image;
generate a context image using the third image;
control the plurality of detectors of the focal plane array to capture a plurality of third images, where the third image is one of the plurality of third images, of the capture-portion of the area as the second portion of the focal plane array is moved relative to the capture-portion of the area; and combine the plurality of third images into a super resolution context image.

11. The image capture system according to claim 10, wherein:

the filter device is fixed to the first portion of the focal plane array, such that the filter device does not move relative to the first portion of the focal plane array; and the controller is further configured to control adjustment of a position of the focal plane array, relative to the capture-portion of the area, to generate the second linear alignment and the third linear alignment with the capture-portion of the area.

12. The image capture system of claim 10, wherein the filter device further comprises at least a first polarization filter, comprising a first polarization value, and a second polarization filter, comprising a second polarization value that is different from the first polarization value, wherein the controller is configured to:

control the plurality of detectors of the focal plane array to capture a fourth image of the area when the capture-portion of the area has a fourth linear alignment with the first polarization filter and a corresponding one of the plurality of detectors, the fourth linear alignment substantially matching the first linear alignment and the second linear alignment;

control the plurality of detectors of the focal plane array to capture a fifth image of the area when the capture-portion of the area has a fifth linear alignment with the second polarization filter and a corresponding one of the plurality of detectors, the fifth linear alignment substantially matching the first linear alignment, the second linear alignment and the fourth linear alignment; and generate a multi-spectral and multi-polarization composite image using at least the first image, the second image, the fourth image and the fifth image.

13. The image capture system of claim 10, further comprising a measuring device configured to track a movement of the focal plane array relative to the capture-portion of the area, wherein the controller is further configured to control the plurality of detectors of the focal plane array to:

capture the second image in response to determining, based on the movement, that the capture-portion of the area has the second linear alignment with the second bandpass filter; and capture the third image in response to determining, based on the movement, that the capture-portion of the area has the third linear alignment with the second portion of the focal plane array.

14. The method of claim 10, wherein the context image comprises a panchromatic context image.

15. An image capture system comprising:

a focal plane array comprising a first portion and a second portion and a plurality of detectors;

a filter device coupled with and covering the first portion of the focal plane array, the filter device comprising at least a first bandpass filter, comprising a first frequency range, and a second bandpass filter, comprising a second frequency range that is different from the first frequency range, wherein the second portion of the focal plane array is uncovered by the filter device; and a controller communicatively coupled with the filter device and the focal plane array, the controller configured to:

control the plurality of detectors of the focal plane array to:

capture a first image of an area when a capture-portion of the area is in a first linear alignment with the first bandpass filter and a corresponding one of the plurality of detectors;

capture a second image of the area when the capture-portion of the area is in a second linear alignment with the second bandpass filter and a corresponding one of the plurality of detectors, the second linear alignment substantially matching the first linear alignment; and capture a third image of the area when the capture-portion of the area is in a third linear alignment with the second portion of the focal plane array and a corresponding one of the plurality of detectors, the third linear alignment substantially matching the first linear alignment and the second linear alignment;

generate a multi-spectral composite image using at least the first image and the second image; and generate a context image using the third image wherein:

the filter device is movable relative to the focal plane array;

the controller is further configured to control adjustment of a position of the filter device to generate the second linear alignment with the capture-portion of the area by controlling a shift in a position of the filter device, relative to the second portion of the focal plane array; and the controller is further configured to control adjustment of the position of the focal plane array, relative to the capture-portion of the area, to generate the third linear alignment with the capture-portion of the area.

16. A method of capturing image data, the method comprising steps of:

capturing, with an image capture apparatus, a first image of an area when a capture-portion of the area is in a first linear alignment with a first bandpass filter of a filter device and a corresponding one of a plurality of detectors of a focal plane array, the filter device coupled to a first portion of the focal plane array;

capturing, with the image capture apparatus, a second image of the area when the capture-portion of the area is in a second linear alignment with a second bandpass filter of the filter device and a corresponding one of the plurality of detectors, the second linear alignment substantially matching the first linear alignment;

capturing, with the image capture apparatus, a third image of the area when the capture-portion of the area is in a third linear alignment with a second portion of the focal plane array and a corresponding one of the plurality of detectors, the third linear alignment substantially matching the first linear alignment and the second linear alignment;

generating a multi-spectral composite image using at least the first image and the second image; and generating a context image using the third image;

wherein:

the step of capturing, with the image capture apparatus, the third image of the area comprises capturing a plurality of third images, where the third image is one of the plurality of third images, of the capture-portion of the area as the second portion of the focal plane array is moved relative to the area; and the step of generating a context image comprises combining the plurality of third images to generate a super resolution context image.

17. The method of claim 16, further comprising:

capturing, with the image capture apparatus, a fourth image of the area when the capture-portion of the area is in a fourth linear alignment with at least one polarization filter of the filter device and a corresponding one of the plurality of detectors, the fourth linear alignment substantially matching the first linear alignment and the second linear alignment; and the step of generating a composite image comprises generating a multi-spectral and polarization composite image using at least the first image, the second image, and the fourth image.

18. The method of claim 16, further comprising a step of adjusting a position of the focal plane array, relative to the capture-portion of the area, to generate the second linear alignment and the third linear alignment.

19. The method of claim 16, further comprising steps of adjusting a position of the filter device, relative to the first portion of the focal plane array, to generate the second linear alignment.

20. The method of claim 16, further comprising steps of:

tracking movement of the focal plane array relative to the capture-portion of the area;

capturing the second image in response to determining, based on a tracked movement of the focal plane array, that the capture-portion of the area is in the second linear alignment with the second bandpass filter and a corresponding one of the plurality of detectors; and capturing the third image in response to determining, based on the tracked movement of the focal plane array, that the capture-portion of the area is in the third linear alignment with the second portion of the focal plane array and a corresponding one of the plurality of detectors.

* * * * *